United States Patent
Murakami

(10) Patent No.: US 7,043,438 B2
(45) Date of Patent: May 9, 2006

(54) MORAL STANDARD PROTECTING SYSTEM IN VOICE AND/OR TEXT COMMUNICATION AND INTERACTIVE GAME SYSTEM USING THEREWITH

(75) Inventor: Akihiko Murakami, Sapporo (JP)

(73) Assignee: Kabushiki Kaisha Micronet, Sapporo (JP)

( * ) Notice: Subject to any disclaimer, the term of this patent is extended or adjusted under 35 U.S.C. 154(b) by 535 days.

(21) Appl. No.: 10/228,336

(22) Filed: Aug. 27, 2002

(65) Prior Publication Data

US 2004/0044529 A1 Mar. 4, 2004

(51) Int. Cl.
*G10L 21/00* (2006.01)

(52) U.S. Cl. .................. 704/273; 704/251; 709/203
(58) Field of Classification Search ........... 704/251, 704/273; 709/203; 463/42
See application file for complete search history.

(56) References Cited

U.S. PATENT DOCUMENTS

| | | | | |
|---|---|---|---|---|
| 5,848,412 A | * | 12/1998 | Rowland et al. | 707/9 |
| 5,848,418 A | * | 12/1998 | de Souza et al. | 707/102 |
| 6,203,433 B1 | * | 3/2001 | Kume | 463/42 |
| 6,453,345 B1 | * | 9/2002 | Trcka et al. | 709/224 |
| 6,493,744 B1 | * | 12/2002 | Emens et al. | 709/203 |
| 2002/0142842 A1 | * | 10/2002 | Easley et al. | 463/42 |

OTHER PUBLICATIONS

Y. Saito et al., "Primer of Internet construction", Kabushiki Kaisha Toppan, pp. 18-29, Mar. 20, 1995.
M. Kaieda et al., "TCP/IP Bible, revised edition", Kabushiki Kaisha ASCII, pp. 346-383, Mar. 21, 1999.
Multimedia Tsushin Kenkyukai, "Text for Networkcomputing", Kabushiki Kaisha ASCII, pp. 262-269, Mar. 11, 1997.
K. Noshita et al., "Algorithms in C++", Kindai Kagakusha, pp. 260-265, Jul. 20, 1994.
J. Murai et al., "TCP/IP Network Administration for Unix-system administrator", Kabushiki Kaisha Ohm-sha, pp. 366-389, Nov. 25, 1994.

* cited by examiner

*Primary Examiner*—V. Paul Harper
(74) *Attorney, Agent, or Firm*—Birch, Stewart, Kolasch & Birch, LLP

(57) ABSTRACT

An administrative server interconnects user terminals through the communication network and transmits voice and/or text information submitted and received between the user terminals to a storage device. The server records in the storage device the voice and/or text information together with identification information of the user terminals that have submitted said voice and/or text information. The server retrieves words that disobey morals in the voice and/or text information recorded in the storage device. The server records disobedient data which indicates disobedience in morals in registration data of the user who submitted the voice and/or text information retrieved by the retrieval and presents the disobedient voice and/or text information and the identification information of the user at the submitting side to an administrator control table of the administrative server.

4 Claims, 2 Drawing Sheets

MORAL STANDARD PROTECTING SYSTEM IN VOICE AND/OR TEXT COMMUNICATION AND INTERACTIVE GAME SYSTEM USING THEREWITH

BACKGROUND OF THE INVENTION

This invention relates to a moral standard protecting system in a voice and/or text communication such as voice chat, electronic bulletin board, or the like and relates to an interactive game system using therewith.

Recently, many persons have utilized voice and/or text communications such as chat, voice chat, electronic bulletin board, electronic message board, or the like, since indefinite many persons can intercommunicate easily. On the other hand, there are many problems in morals, for example, aspersion, detraction, decrial against the others, since the voice and/or text communication have suppressive features.

On the other hand, persons who enjoy interactive games on communication networks such as the Internet, cable television networks (CATV), or the like have been increasing. Since expressions of one's will to opponents in the game are carried out by means of text, some persons who are unfamiliar to key operations are likely to be busy with the game. They have felt arid in the play because the game progresses without expressing their wills. On the contrary, there are problems in morals, for example, decrial or obscenity words are submitted to the opponents on account of absorption in the game. This results in abatement of attraction for the game.

OBJECT AND SUMMARY OF THE INVENTION

An object of the present invention is to provide a system that monitors any problem actions in morals such as aspersion, detraction, and decrial against the others in a voice and/or text communication such as chat, voice chat, electronic bulletin board, electronic message board, or the like and that restricts or rejects a utilization of a user who has done problem actions in morals.

Another object of the present invention is to provide a system that permits players to express one's will in interactive games on a communication network by means of a voice and/or text communication, thereby creating more interesting games and reducing the problem actions in morals to the minimum.

A system in accordance with the present invention protects moral standard in a voice and/or text communication effected between user terminals through an administrative server on a communication network. The administrative server includes the steps of: interconnecting the user terminals through the communication network; transmitting voice and/or text information submitted and received between the user terminals to a storage device; recording in the storage device the transmitted voice and/or text information together with identification information of the user terminal that has submitted the voice and/or text information; retrieving words that disobey morals in the voice and/or text information recorded in the storage device; recording disobedient data, which indicates disobedience in morals, in registration data of the user who has submitted the voice and/or text information retrieved by the retrieval; and presenting the disobedient voice and/or text information and the identification information of the user at the submitting side to an administrator control table in the administrative server.

A system in accordance with the present invention also protects moral standard in a combination of a voice and/or text communication and an interactive game performed between user terminals through an administrative server on a communication network. The administrative server includes the steps of: setting up a game table in reply to a request from an accessing user terminal; presenting the game table information to the accessing user terminal; recruiting entries by notifying the setting-up of the game table to other user terminals; presenting the game table information to a new user terminal that wishes to enter the game in reply to a request from the new user terminal; enabling the new user terminal and existing user terminals that have entered the game to submit and receive game information that is changing in association with a progress of the game and the voice and/or text information by connecting the new user terminal to the existing user terminals; recording in a storage device the game information and the voice and/or text information that have been submitted and received between the user terminals within a period from the setting-up time of the game table to the closing time of the game table together with identification information of the user terminals that have entered the game; retrieving words that disobey morals in the voice and/or text information recorded in the storage device; recording disobedient data which indicates disobedience in morals in registration data of the user who has submitted the voice and/or text information retrieved by the retrieval; and presenting the disobedient voice and/or text information and the identification information of the user at the submitting side to an administrator control table in the administrative server.

In order to actively protect moral standard in the system of the present invention, the administrative server further includes the steps of: notifying warning information to a user terminal that has submitted voice and/or text information in disobedient morals when the administrative server confirms that voice and/or text information presented on the administrative control table of the administrative server disobeys morals; and canceling the disobedient data added to registration data of the user terminal when the administrative server confirms that voice and/or text information presented on a control table of the administrative server does not disobey morals. In addition, the administrative server submits and receives the voice and/or text information between the user terminals at a given interval in time and records the voice and/or text information in the storage device at the given interval in time.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
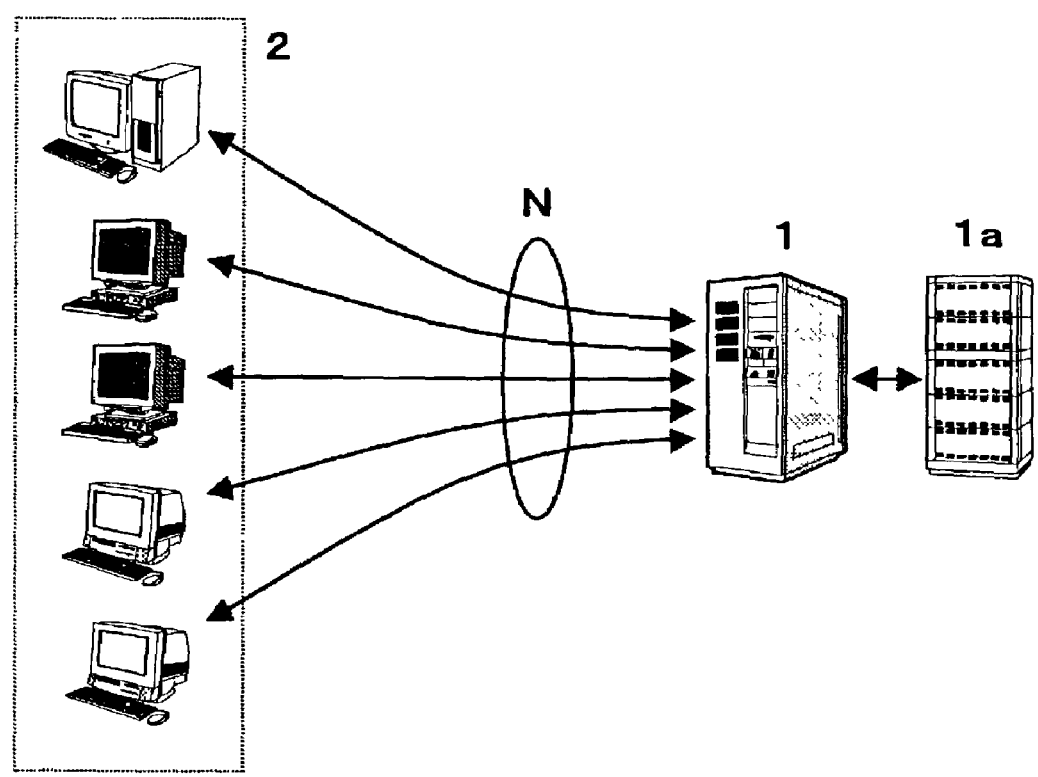
FIG. 1 is an explanatory view that schematically illustrates an embodiment of a moral standard protecting system in a voice and/or text communication in accordance with the present invention.

By referring now to the drawings, embodiments of a moral standard protecting system and an interactive game system utilizing therewith in accordance with the present invention will be described below.

EXAMPLE 1

An embodiment of a system in accordance with the present invention, as shown in FIG. 1, is a system for protecting moral standard in voice and/or text communication performed between user terminals 2 through an administrative server 1 on a communication network N such as the Internet, cable television networks (CATV), or the like. The administrative server 1 includes a storage device 1a having large capacity to record various kinds of information described hereinafter.

The system of this embodiment can be broadly divided into steps of certificating users, recording voice and/or text information that is submitted and received between the user terminals 2 on a voice and/or text communication, retrieving a disobedience in morals in the recorded voice and/or text information, and warning the disobedience in morals.

<<Identification of a User>>

A user who wishes a connection starts a specific purpose application in the user terminal 2, and connects the user terminal 2 to the communication network N, and accesses the administrative server 1. The administrative server 1 requires an identification ID to the accessing user terminal. The administrative server 1 extracts from the storage device 1a the registration information corresponding to the identification ID submitted from the user terminal 2, and checks the registration information. If there is no problem, the administrative server 1 accepts the access of the user and establishes the connection. If there is any problem, the server 1 rejects the access of the user. At this time, the registration information to be recorded in the storage device 1a includes disobedient data concerning a frequency and a degree of disobedience in morals described hereinafter. When the user accesses the administrative server 1, the server 1 takes a disposal such as a warning to the user, a rejection of the access, or the like in accordance with contents in the disobedient data of the user.

<<Recording of Information>>

A voice and/or text communication between the user terminals 2 transmits voice and/or text information in an interval in time of, for example, one-fourth seconds. This transmission of the voice and/or text information is carried out by generally utilizing a compression/decompression technique that is conventional in the art. When the voice and/or text communication starts, the administrative server 1 records in a folder in order the voice and/or text information transmitted in a given period in time and produce communication data by writing the user identification ID of the user who has carried out the voice and/or text communication in the folder.

<<Retrieval of Disobedience in Morals>>

An operation of retrieving disobedience in morals in the recorded voice and/or text information is carried out usually periodically. The administrative server 1 invokes the communication data recorded in the storage device 1a and retrieves whether any words corresponding to disobedience in morals are used in the voice and/or text information. For this purpose, disobedient data of words or the like corresponding to disobedience in morals are registered beforehand as wave data and text data in the storage device 1a. The retrieval is carried out by comparing the voice and/or text information and the data corresponding to disobedience in morals. In results of the retrieval, when the server 1 decides that the words or the like corresponding to disobedience in morals are used, the server 1 records the disobedient data that indicates the disobedience in morals in the registration information of the user at the side submitting the voice and/or text information.

<<Warning of Disobedience in Morals>>

An administrator invokes information concerning disobedience in morals from the storage device 1a onto the administrative control table (not shown) and confirms again the voice and/or text information that has been decided to be disobedient in morals by actually hearing or seeing the information. In results of confirmation, the voice and/or text information that has been decided to be disobedient in morals is added to the registration information of the user as additional information to notify a waning when the user who has submitted the disobedient information accesses the server 1. In the case where a frequency and a degree of disobedience in morals are flagrant or the warning is blinked, the administrator preferably records the information of the user on a blacklist so that the administrative server 1 restricts or rejects an access of the user when identifying the user as described above.

EXAMPLE 2

Figure 2:
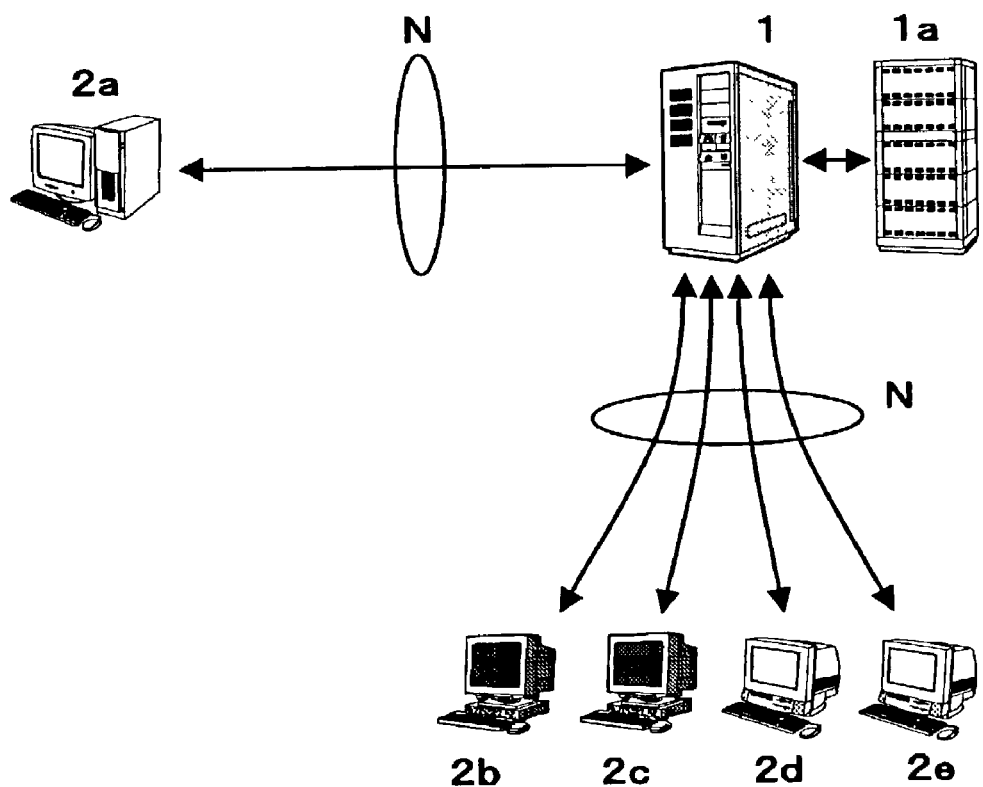
FIG. 2 is an explanatory view that schematically illustrates another embodiment of a moral standard protecting system and an interactive game system utilizing therewith in accordance with the present invention.

Another embodiment of a system in accordance with the present invention is, as shown in FIG. 2, a system for protecting moral standard in a combination of a voice and/or text communication and an interactive game performed between user terminals 2 (2a, 2b, 2c, . . . ) through an administrative server 1 on a communication network N.

The system in this embodiment can be broadly divided into functions of providing an interactive game and protecting moral standard in a voice and/or text communication described in Example 1.

A user who wishes to play an interactive game accesses an administrative server 1 from a user terminal 2a and must receive user identification, as described in the first embodiment. When the user is identified, the administrative server 1 establishes a connection between the administrative server 1 and the user terminal 2a, and ensures a transmitting path for game information, and also ensures a transmitting path for voice and/or text information. On the other hand, the administrative server 1 sets up a game table for the game that the user wishes to play and submits and presents game table information to the user terminal 2a. At the same time, the administrative server 1 indicates the setting-up of the game table to the other accessed user terminals 2b, 2c, . . . to recruit entries. The user who wishes to enter the game acquires the set-up game table information from the administrative server 1 and presents game table information on the user terminal 2b. Then, the administrative server 1 establishes a connection between the server 1 and the user terminal 2b and ensures a transmitting path for game information and voice and/or text information by the same process that has done to the first entry (2a).

When the entries are decided, the game starts. Since contents of a game itself, a process of progress, and the like are outside the scope of the present invention, explanations of them are omitted here. The administrative server 1 records in a storage device 1a game information that is changing in association with a progress of the game and voice and/or text information that have submitted and received between the user terminals while the game is played.

The administrative server 1 retrieves words or the like corresponding to disobedience in morals in voice and/or text information recorded in the storage device 1a. The retrieved voice and/or text information is presented on an administrative control table. It will be easily understood for a person skilled in the art that the process for protecting moral standard by utilizing warning means or the like to the user who has used the voice and/or text information that is decided to be disobedient in morals by the administrative server is same as the process in the first embodiment described above. However, in this embodiment, it should be noted that entries can enjoy an interactive game further since they can recognize that they are playing with not a machine partner but other human entries by their communication each other via the voice and/or text communication in the game, in addition to protecting moral standard.

According to the present invention, in a voice and/or text communication such as chat, voice chat, electronic bulletin board, electronic message board, or the like, it is possible for an administrator to take a suitable disposal and prevent any problem actions in morals such as aspersion, detraction, decrial, or the like to the others by recording in the storage device 1a transmitted voice and/or text information together with identification information of the user terminal that has submitted the voice and/or text information, retrieving words that disobey morals in the voice and/or text information recorded in the storage device, recording disobedient data which indicates disobedience in morals in registration data of the user who has submitted the voice and/or text information retrieved by the retrieval, presenting the disobedient voice and/or text information and the identification information of the user at the submitting side to an administrator control table in the administrative server. Also, it is possible to express one's will by a voice and/or text communication in an interactive game on the Internet as well as to protect moral standard in a voice and/or text communication, thereby making the game more interesting.

From the above description of the invention, one skilled in the art will perceive improvements, changes and modifications. Such improvements, changes and modifications within the skill of the art are intended to be covered by the appended claims.

The invention claimed is:

1. A system for protecting moral standard in a voice and/or text communication between user terminals through an administrative server on a communication network,
said administrative server including the steps of:
interconnecting said user terminals through said communication network;
transmitting voice and/or text information submitted and received between said user terminals to a storage device;
recording in said storage device said transmitted voice and/or text information together with identification information of the user terminal that has submitted said voice and/or text information;
retrieving words that disobey morals in said voice and/or text information recorded in said storage device;
recording disobedient data which indicates disobedience in morals in registration data of the user who has submitted said voice and/or text information retrieved by said retrieval; and
presenting said disobedient voice and/or text information and said identification information of the user at the submitting side to an administrator control table in said administrative server,
wherein said administrative server further includes the steps of: notifying warning information to a user terminal that has submitted voice and/or text information in disobedient morals when said administrative server confirms that a voice and/or text information presented on said administrative control table of said administrative server disobeys morals; and canceling the disobedient data added to registration data of said user terminal when said administrative server confirms that voice and/or text information presented on a control table of said administrative server does not disobey morals.

2. A system according to claim 1 wherein said administrative server submits and receives said voice and/or text information between said user terminals at a given interval in time and records said voice and/or text information in said storage device at said given interval in time.

3. A system for protecting moral standard in a combination of a voice and/or text communication and an interactive game between user terminals through an administrative server on a communication network,
said administrative server including the steps of:
setting up a game table in reply to a request from an accessing user terminal;
presenting game table information to said accessing user terminal;
recruiting entries by notifying the setting-up of said game table to other user terminals;
presenting game table information to a new user terminal that wishes to enter the game in reply to a request from said new user terminal;
enabling the new user terminal and existing user terminals that have entered the game to submit and receive game information that are changing in association with a progress of the game and the voice and/or text information by connecting the new user terminal to the existing user terminals;
recording in a storage device said game information and said voice and/or text information that have been submitted and received between said user terminals within a period from the setting-up time of said game table to the closing time of said game table together with identification information of the user terminals that have entered the game;
retrieving words that disobey morals in said voice and/or text recorded in said storage device;
recording disobedient data which indicates disobedience in morals in registration data of the user who has submitted said voice and/or text information retrieved by said retrieval;
presenting said disobedient voice and/or text information and said identification information of the user at the submitting side to an administrator control table in said administrative server, wherein said administrative server further includes the steps of: notifying warning information to a user terminal that has submitted voice and/or text information in disobedient morals when said administrative server confirms that voice and/or text information presented on said administrative control table of said administrative server disobeys morals; and canceling the disobedient data added to registration data of said user terminal when said administrative server confirms that voice and/or text information presented on a control table of said administrative server does not disobey morals.

4. A system according to claim 3 wherein said administrative server submits and receives said game information and said voice and/or text information between said user terminals at a given interval in time and records said game information and said voice and/or text information in said storage device at said given interval in time.

* * * * *